United States Patent
Mortensen et al.

(10) Patent No.: US 11,774,195 B2
(45) Date of Patent: Oct. 3, 2023

(54) COOLING TOWER WITH UV TREATMENT OF DRIFT

(71) Applicant: SPX Cooling Technologies, Inc., Overland Park, KS (US)

(72) Inventors: Kenneth P. Mortensen, Bonner Springs, KS (US); Joseph Evans, Kansas City, MO (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 373 days.

(21) Appl. No.: 16/869,777

(22) Filed: May 8, 2020

(65) Prior Publication Data

US 2020/0363144 A1 Nov. 19, 2020

Related U.S. Application Data

(60) Provisional application No. 62/849,390, filed on May 17, 2019.

(51) Int. Cl.
  *C02F 1/32* (2023.01)
  *F28F 25/00* (2006.01)
  *C02F 103/02* (2006.01)

(52) U.S. Cl.
  CPC .............. *F28F 25/00* (2013.01); *C02F 1/325* (2013.01); *C02F 2103/023* (2013.01); *C02F 2201/3227* (2013.01); *C02F 2201/3228* (2013.01); *C02F 2303/04* (2013.01); *F28F 2025/005* (2013.01); *F28F 2265/20* (2013.01)

(58) Field of Classification Search
  CPC ...... C02F 1/32; C02F 1/48; C02F 1/72; F28F 12/00
  See application file for complete search history.

(56) References Cited

U.S. PATENT DOCUMENTS

| | | | | |
|---|---|---|---|---|
| 2,437,484 A | * | 3/1948 | Simons | F28C 1/02 261/DIG. 11 |
| 4,092,811 A | * | 6/1978 | Lin | E04H 5/12 52/80.1 |
| 5,585,047 A | * | 12/1996 | Mortensen | A62C 3/00 261/DIG. 11 |

(Continued)

FOREIGN PATENT DOCUMENTS

| | | | |
|---|---|---|---|
| CN | 207468377 U | * | 6/2018 |
| CN | 210292902 U | | 4/2020 |
| ES | 1053318 U | | 4/2003 |

OTHER PUBLICATIONS

ES 1053318 U to Fernandez Lopez Antonio description translation (Year: 2002).*

(Continued)

*Primary Examiner* — Walter D. Griffin
*Assistant Examiner* — Cameron J Allen
(74) *Attorney, Agent, or Firm* — Husch Blackwell LLP

(57) ABSTRACT

The present disclosure relates to a cooling tower having a fill media, water distribution system, plenum, and an ultraviolet (UV) light emitter. The water distribution system distributes water to the fill media. A flow of air passes through the fill media and past a flow of the water and out of the cooling tower via an outlet. The plenum is defined by a volume between the fill media and the outlet. The UV light emitter is disposed in the plenum and configured to inactivate or kill organisms in a drift.

14 Claims, 9 Drawing Sheets

(56) References Cited

U.S. PATENT DOCUMENTS

| | | | |
|---|---|---|---|
| 6,170,216 B1 | 1/2001 | Rye et al. | |
| 6,500,387 B1 * | 12/2002 | Bigelow | A61L 9/20 |
| | | | 55/286 |
| 7,151,264 B2 | 12/2006 | Ehlers, Sr. | |
| 8,628,066 B2 * | 1/2014 | Boyd | F28F 25/04 |
| | | | 261/DIG. 11 |
| 2014/0260987 A1 | 9/2014 | Park et al. | |
| 2016/0356549 A1 | 12/2016 | Yang et al. | |
| 2017/0299268 A1 | 10/2017 | Maurer et al. | |

OTHER PUBLICATIONS

CN-207468377-U; Jun. 2018, county CN; Guo S, translation (Year: 2018).*

Marley; Crossflow vs. Counterflow Cooling Towers; SPX Cooling Technologies, Inc. (Year: 2018).*

Cooling Tower (Wikipedia) accessed on Jul. 15, 2020 (Jul. 15, 2020) [online] retrieved from <URL:https://en.wikipedia.org/wiki/Cooling_tower#:~:text=Hyperboloid%20(sometimes%20incorrectly%20known%20as,air%20flow%2C%20improving%20cooling%20efficiency.>, entire document.

Extended European Search Report issued for European Patent Application No. 20809568.7, dated May 10, 2023, 14 pages.

* cited by examiner

COOLING TOWER WITH UV TREATMENT OF DRIFT

PRIORITY OF THE INVENTION

This application claims priority to U.S. Provisional Patent Application Ser. No. 62/849,390, filed May 17, 2019, the disclosure of which is hereby incorporated by reference in its entirety.

FIELD OF THE INVENTION

The present disclosure relates generally to cooling towers or heat exchange towers. More particularly, the present disclosure relates, for example, to treating drift expelled from the cooling tower.

BACKGROUND OF THE INVENTION

Cooling towers are heat exchangers of a type widely used to emanate low grade heat into the atmosphere and are typically utilized in electricity generation, air conditioning installations, and the like. These towers receive a relatively warm or hot fluid, and pass the fluid through the tower apparatus so that heat is extracted from the fluid by interaction with relatively cooler ambient air.

Cooling towers generally include counter-flow type cooling towers and cross-flow type cooling towers. In a counter-flow cooling tower, liquid flows downwards through fill media or packing and is brought into contact with air traveling upwards. Conversely, in a cross-flow cooling tower, liquid comes in contact with air that moves horizontally through the fill media or packing. The heated air is exhausted into the atmosphere using a fan, and the cooling liquid is collected in a basin situated below the fill media or packing.

Liquid is generally distributed through a cooling tower in one of two ways: gravity and spray. Typically, gravity systems are used in cross-flow cooling towers, and spray systems are used in counter-flow cooling towers. In a spray system, liquid is distributed through the cooling tower using a series of spray nozzles mounted on distribution pipes. The spray nozzles are arranged to evenly distribute the liquid over the top of the fill media. Once the liquid travels through the fill media, it is collected at the bottom of the tower in a cold liquid basin. In a gravity system, liquid is fed into a liquid basin disposed above the fill media. The liquid then travels through holes or openings in the bottom of the hot liquid basin to the fill media. Similar to the spray system, liquid that travels through the fill media is collected at the bottom of the tower in a secondary liquid basin.

As the airflow in both the crossflow-type and counter-flow-type of cooling towers flows past the flow of water, water droplets, termed 'drift', are entrained in the airflow. For a variety of reasons, such as reducing water usage and ice buildup, cooling towers typically employ drift eliminator devices to reduce the drift. However, drift eliminators do not generally remove all the drift. This small amount of residual drift typically does not adversely affect the operation of the cooling tower.

A drawback associated with current cooling towers is that organic growth can occur in the water or on wet surfaces of the cooling tower. This growth is minimized by reducing light infiltration, reducing stagnant water accumulation, and the like. Depending on the organism and location of the growth, the organism can become airborne and ejected from the cooling tower with the drift.

It is desirable to reduce the ejection of viable organisms from the cooling tower. In particular, it is desirable to reduce the number of viable organisms in the drift ejected from the cooling tower.

SUMMARY OF THE INVENTION

Embodiments of the present disclosure advantageously provide for an apparatus and method of reducing the number of viable organism ejected in the drift from cooling towers.

An embodiment of the disclosure pertains to a cooling tower having a fill media, water distribution system, plenum, and an ultraviolet (UV) light emitter. The water distribution system distributes water to the fill media. A flow of air moves through the fill media and past a flow of the water and out of the cooling tower via an outlet. The plenum is defined by a volume between the fill media and the outlet. The UV light emitter is disposed in the plenum and configured to inactivate organisms in the drift.

Another embodiment relates to a method of treating the drift from a cooling tower. In this method, a flow of water through a fill media is generated. A flow of air through the fill media with is generated. An ultraviolet (UV) light emitter is disposed in a plenum of the cooling tower and configuring the UV light emitter to expose the drift in the plenum to a sufficient luminous flux of UV light to kill or inactivate organisms in the drift, wherein the plenum is defined by a volume between the fill media and the outlet or discharging air exit.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

Figure 1:
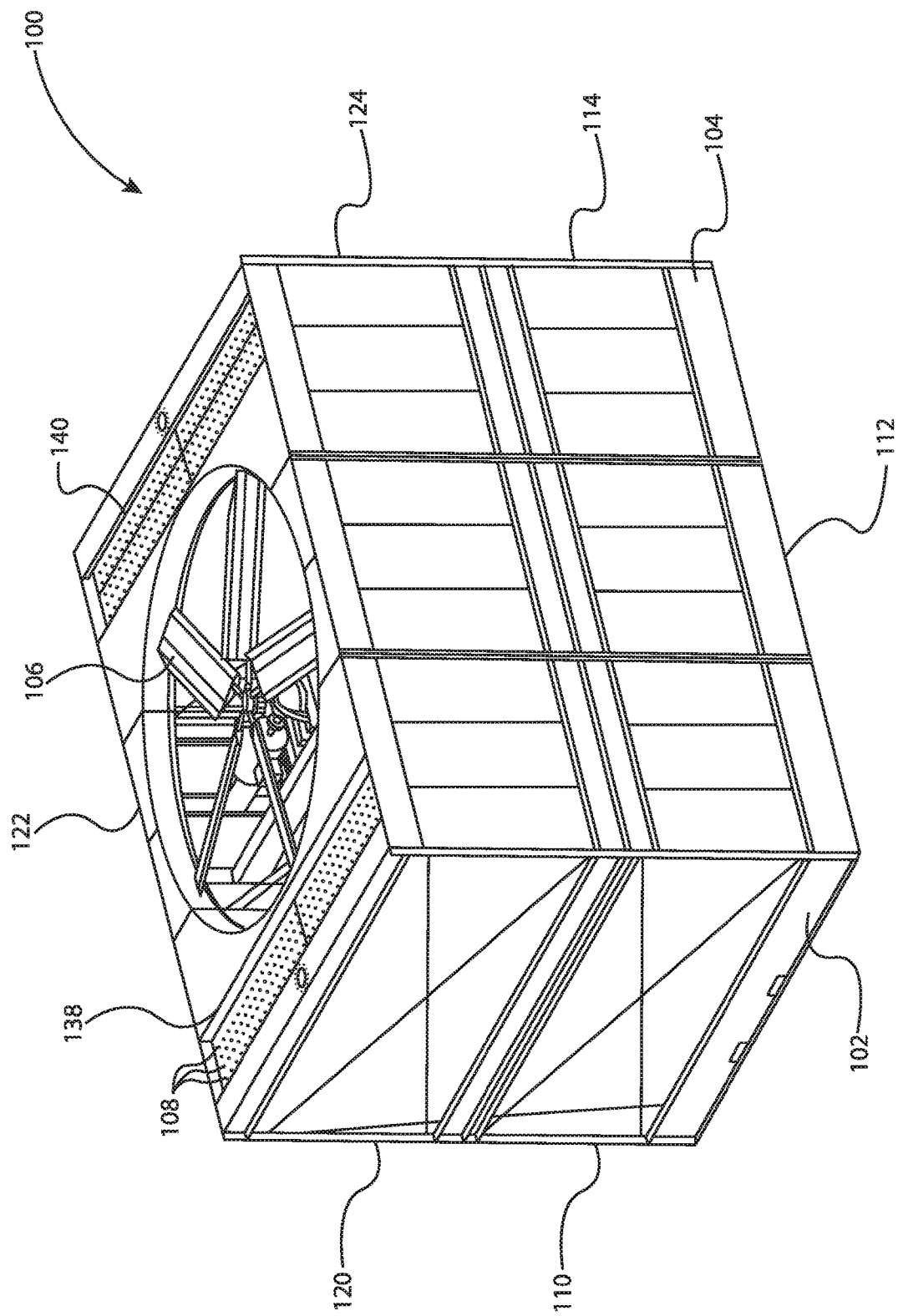
FIG. 1 is a perspective view of a first exemplary cooling tower in accordance with an embodiment of the present disclosure.

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Cooling towers regulate the temperature of a fluid by passing the fluid through a tower apparatus that brings it into contact with ambient air. These towers typically include a hot liquid distribution system. Examples of these distribution systems may have a series of water distribution nozzles or an apertured distribution basin or the like, and a cold water collection basin positioned at the base or bottom of the cooling tower. Commonly, a water dispersing fill media structure is disposed in the space between the hot water distribution system and the underlying cold water collection basin. The aforementioned fill media structure oftentimes includes either a plurality of elongated, horizontally arranged and staggered splash bars supported at spaced intervals by an upright grid structure or frame assembly, or a series of fill media packs or fill media packing composed of a number of film fill media sheets. During assembly of the evaporative cooling towers, typically, an outer shell or support structure is built first and then the fill media is installed. In the case of splash type fill media, a rack or grid support is affixed to the support shell. Splash bars are then threaded into the rack. The splash bars generally provide a surface for consistent, predictable dispersal and breakup of the water droplets over a range of water loadings typically encountered during operation of the evaporative cooling tower. Typically, these splash bars are long and thin and the fill media structure includes a great number of them. In the case of film fill media, fill media packs may be employed and installed into the support structure of the cooling tower. Fill media packs may consist of individual sheets glued or attached by some other means to one another to make blocks. Alternatively, fill media packs may consist of sheets hung from support members. Successive sheets are pushed on support members from one end and push down the support member until the support member is populated with the desired number of sheets. The fill media packs are then placed in the support structure. In yet another example, fill media may include coils of tubing that may include fins and/or supporting panels. These coils may be included with other types of fill media.

In a cross-flow tower, hot liquid is distributed over the fill media section such that it comes into contact with cooler ambient air, which cools the hot liquid as the air travels horizontally or laterally through the fill media section. These towers typically include an air inlet region that is disposed adjacent to the fill media section, which allows air from outside of the tower to travel into the fill media section. Generally, the dimensions of the air inlet region may correspond to the height of the fill media section, allowing even distribution of air travel through the fill media section. The tower also includes a plenum area or plenum chamber for receiving the air after it has travelled through the fill media section, and a fan or other air current generator for directing the air into the atmosphere once again.

Hot liquid may be distributed in a cooling tower using a pipe distribution system. A pump may feed water into the pipes, which carry the water to nozzles that eject the water onto the fill media section. The ejected water then travels through the fill media section and is collected at the bottom in a cold liquid basin, which may have an outlet (e.g., a pipe opening) for passing the cold liquid out of the cooling tower. As an alternative to a pipe distribution system, hot liquid may also be distributed in a cooling tower using water distribution basins having apertures for the water to flow through onto the fill media section. Such as system is known as a gravity-driven distribution system. Once the liquid flows through the fill media section and is cooled, it is similarly collected by a cold water basin, which may eject the cooled liquid to the outside.

Air flowing past the falling water can entrain water droplets in the air flow. To remove this drift, fill media sections typically include drift eliminators. In this manner, water is conserved and icing is reduced. However, some drift does pass through the drift eliminators and is drawn out of the cooling tower via the current generator.

Systems and methods disclosed herein provide an ultraviolet (UV) treatment of the drift in both crossflow and counterflow cooling towers. The treatment of the drift is more efficient because of the greater penetration of the UV light through air and small droplets as opposed to treating water in the cold water basins or other areas. In addition, in the plenum area of the cooling tower reduces water exposure to the UV light emitters leading to a longer service life. Furthermore, because the UV exposure only occurs just prior to ejection from the cooling tower, organisms in the drift do not have sufficient time to develop UV resistance. This may increase the lethality to waterborne organisms.

Referring now to FIG. 1, a first exemplary cooling tower 100 is depicted. The cooling tower 100 may be, for example, a heat exchange, heat transfer, cooling tower or the like. In the following description of the cooling tower 100, particular mention of the modular construction is mentioned. However, the examples provided herein are for illustrative purposes only. As such, it is to be understood that any suitable cooling tower may incorporate UV light emitters to treat the drift. In a particular example, the cooling tower 100 may comprise six (6) modules including: a first collection basin module 110, a plenum module 112, a second collection basin module 114, a first heat exchange module 120, a fan module 122, and a second heat exchange module 124. Of note, while the fan module 122 is shown as an axial fan, in other examples, the fan module 122 may include a radial fan or blower. Furthermore, the fan module 122 may be disposed at or near the top of the cooling tower 100, as shown, or may be disposed at any other suitable location such as the bottom or sides of the cooling tower 100. The cooling tower 100 may also comprise a first water basin 102 and a second water basin 104. Water basins 102, 104 may be examples of the first basin and the second basin, as set forth in the claims.

The first water basin 102 may be disposed in the first collection basin module 110, and the second water basin 104 may be disposed in the second collection basin module 114. More specifically, the first water basin 102 may be disposed at a bottom portion of the first collection basin module 110, and the second water basin 104 may be disposed at a bottom portion of the second collection basin module 114. The first collection basin module 110 and the second collection basin module 114 may be laterally spaced apart from one another, and thus the first water basin 102 and the second water basin 104 may be laterally spaced apart from one another.

As depicted in FIG. 1, the water basins 102, 104 are separately sealed from each other. The water basins 102, 104 may be sealed in a factory prior to being transported to a job site for final assembly in the cooling tower 100. Alternatively, the water basins 102, 104 may be partially constructed in a factory and sealed at a job site. Furthermore, while the water basins 102, 104 are depicted as separately sealed units in FIG. 1, one of ordinary skill in the art would appreciate that the water basins 102, 104 need not be separately sealed but can be in fluid communication with one another such that they form a common basin.

As depicted in FIG. 1, the plenum module 112 is disposed in the space between the first collection basin module 110 and the second collection basin module 114. Together, the first collection basin module 110, the plenum module 112, and the second collection basin module 114, may form a first layer—specifically, a bottom layer or base—of the cooling tower 100.

In a separate layer—specifically, a top layer—the first heat exchange module 120, the fan module 122, and the second heat exchange module 124 may be disposed. The first heat exchange module 120 may be disposed above the first collection basin module 110 or, in other words, the first heat exchange module 120 may be disposed vertically adjacent to the first collection basin module 110. And the second heat exchange module 124 may be disposed above the second collection basin module 114 or, in other words, the second heat exchange module 124 may be disposed vertically adjacent to the second collection basin module 114. The heat exchange modules 120, 124 may be disposed vertically adjacent to the collection basin modules 110, 114 in a longitudinal direction. The collection basin modules 110, 114 and the heat exchange modules 120, 124 may have openings along their exterior sides for allowing air from outside of the cooling tower 100 to travel into the cooling tower 100 or, specifically, to travel into the collection basin modules 110, 114 and the heat exchange modules 120, 124.

The fan module 122 may be disposed vertically adjacent to the plenum module 112. Both the plenum module 112 and the fan module 122 may comprise hollow chambers for receiving air travelling through the collection basin modules 110, 114 and the heat exchange modules 120, 124 from outside of the cooling tower 100. The fan module 122 may also include a supporting attachment for holding a fan cylinder and a fan 106. The fan 106 may be an example of an air current generator, such as a fan, chimney, or impeller where the discharging air exits. The fan 106 may pull the air that travels through the collection basin modules 110, 114 and the heat exchange modules 120, 124 from the outside atmosphere into the plenum module 112 and the fan module 122 and back out into the atmosphere.

Figure 3:
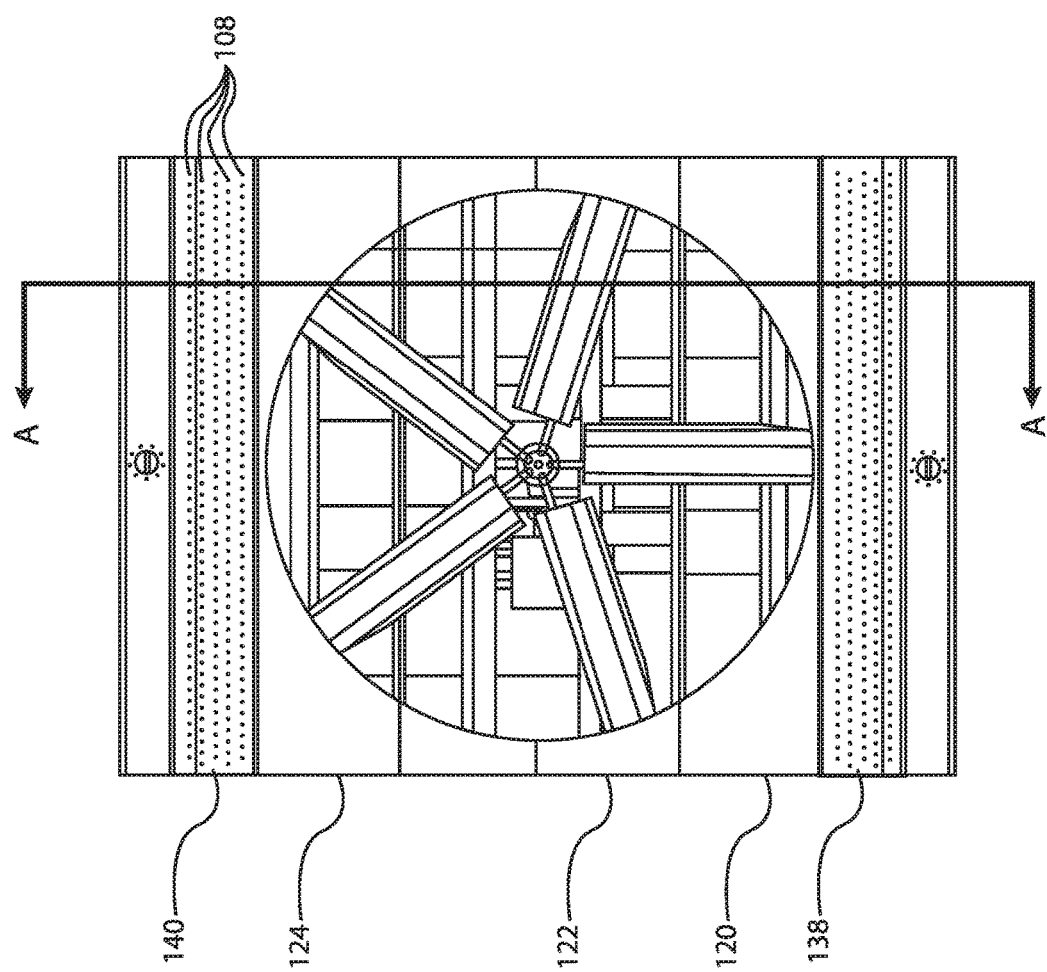
FIG. 3 is a top view of the cooling tower depicted in FIG. 1 showing an air current generator in accordance with an embodiment of the present disclosure.
Figure 4:
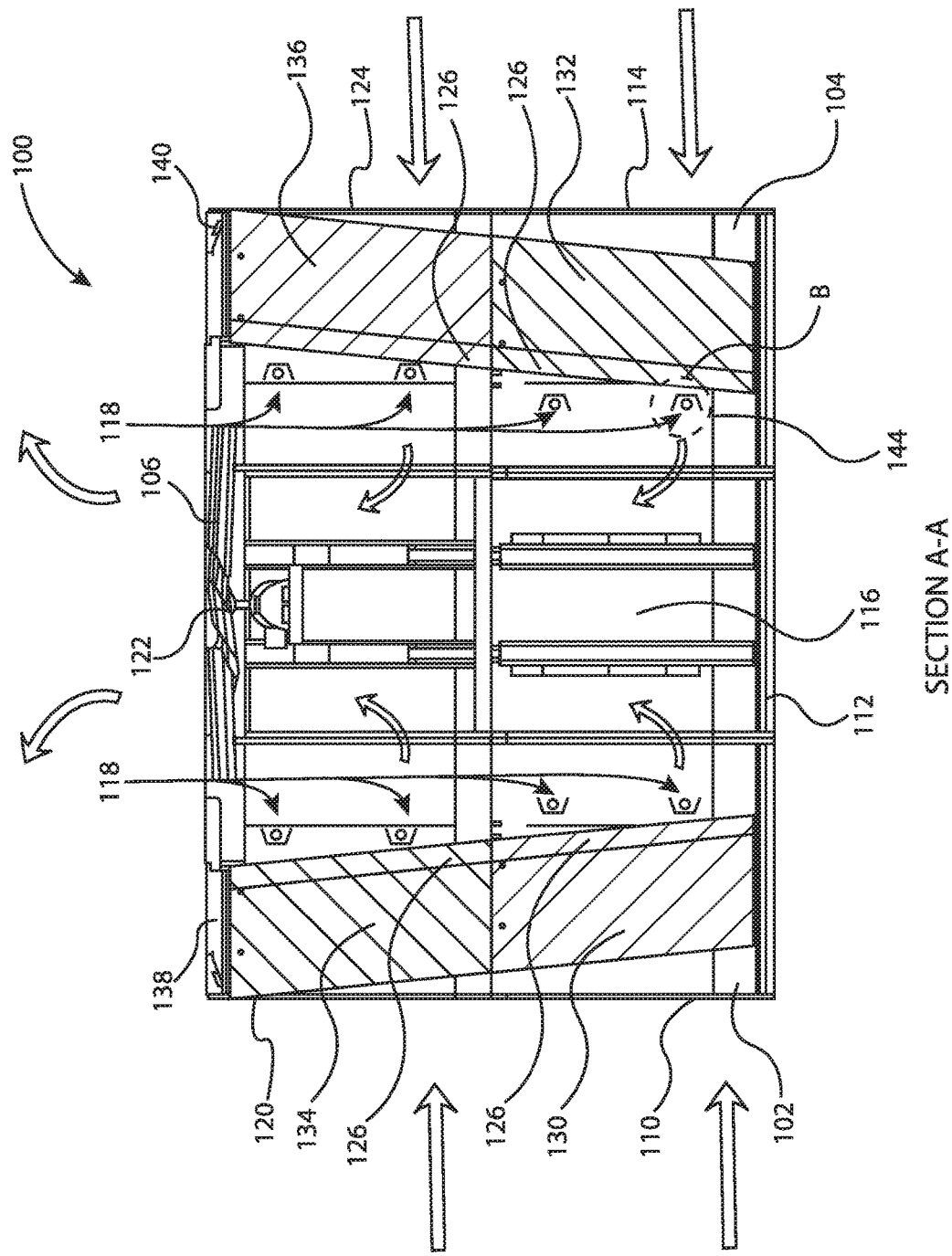
FIG. 4 is a cross-sectional view of the cooling tower depicted in FIG. 1 showing a plurality of ultraviolet (UV) light emitters in accordance with an embodiment of the present disclosure.

Additionally, the cooling tower 100 may comprise a first hot water basin 138 and a second hot water basin 140 (see, e.g., FIGS. 3 and 4). The first hot water basin 138 may be disposed in the first heat exchange module 120, and the second hot water basin 140 may be disposed in the second heat exchange module 124. More specifically, the first hot water basin 138 may be disposed in a top portion of the first heat exchange module 120, and the second hot water basin 140 may be disposed in a top portion of the second heat exchange module 124. Each of the first hot water basin 138 and the second hot water basin 140 may comprise a plurality of openings or apertures 108. The openings may be configured to allow a liquid that is placed in the hot water basins 138, 140 to travel out of the hot water basins 138, 140 and into lower regions of the cooling tower 100 typically via nozzles—specifically, into fill media portions or sections disposed in the heat exchange modules 120, 124. Further details regarding the travel of liquid from the hot water basins 138, 140 and through the cooling tower 100 is described in reference to FIG. 4, below.

Figure 2:
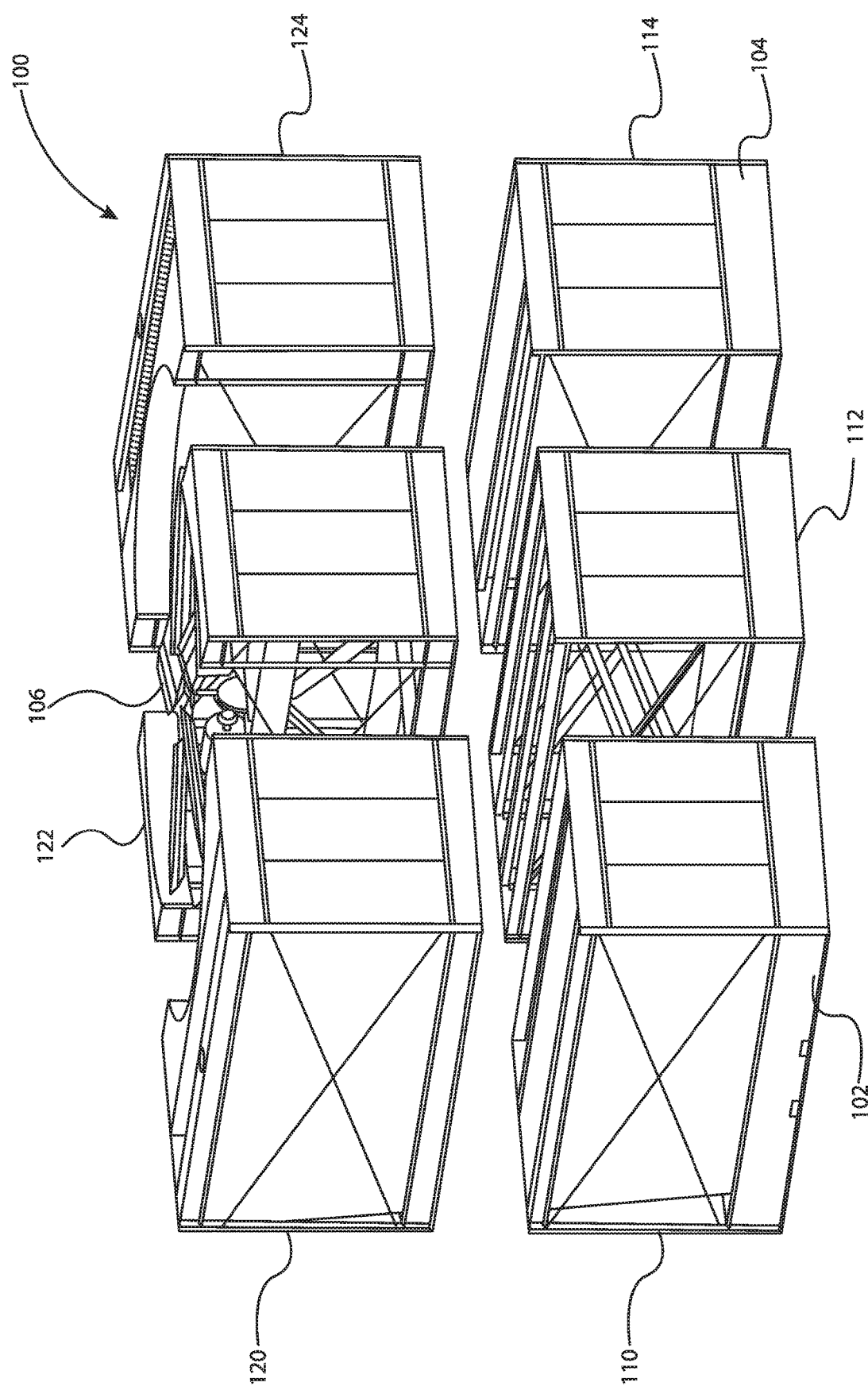
FIG. 2 is an exploded view of the cooling tower depicted in FIG. 1 showing a plurality of modular components of the cooling tower in accordance with an embodiment of the present disclosure.

Referring now to FIG. 2, an exploded view of the cooling tower 100 is depicted. This exploded view shows in greater detail each of the six (6) modular components—the collection basin modules 110, 114; the plenum module 112; the heat exchange modules 120, 124; and the fan module 122—of the cooling tower 100. This exploded view shows that the first water basin 102 is disposed in the first collection basin module 110, and the second water basin 104 is disposed in the second collection basin module 114. The exploded view also shows that the fan 106 is disposed in the heat exchange modules 120, 124 and the fan module 122.

Referring now to FIG. 3, a top view of the cooling tower 100 is depicted. As depicted in FIG. 3, the heat exchange modules 120, 124 and the fan module 122 are disposed adjacent to one another—specifically, the fan module 122 is disposed between the first heat exchange module 120 and the second heat exchange module 124. Further, as shown in FIG. 3, the first hot water basin 138 extends along a length of the first heat exchange module 120, and the second hot water basin 140 extends along a length of the second heat exchange module 124.

FIG. 4 depicts a cross-sectional view of the cooling tower 100 along the line A-A and in the direction of the arrows depicted in FIG. 3. As shown in this cross-sectional view, a plenum 116 of the cooling tower 100 includes a plurality of ultraviolet (UV) light emitters 118. In a particular example, the UV light emitters 118 may be configured to emit UV-C light having a wavelength from about 200 nanometers (nm) to about 280 nm. The plenum 116 is defined as a volume within the cooling tower 100 between the inside face of the fill media portions 130-136 and the fan 106. As shown by the arrows, air enters the plenum 116 as it is drawn through the fill media portions 130-136 by the fan 106 and is then ejected from the cooling tower 100 via the fan 106. To reduce the drift entering the plenum 116, the fill media portions 130-136 each include a drift eliminator 126. In a particular example, the drift eliminator may be configured to reduce the amount of drift to 0.001% of circulating water or less. This very low rate of drift may increase the effectiveness of the UV light emitters 118 by reducing diffraction/absorption of UV light caused by the entrained droplets.

Optionally, as shown in detail B of FIG. 9, the UV light emitters 118 may include a shield 142 to reduce UV exposure of the fill media portions 130-136 and/or drift eliminator 126. In this manner, UV breakdown of the fill media portions 130-136 and/or drift eliminator 126 may be reduced. The shield may include a UV reflective portion configured to increase the amount of UV light directed toward a center of the plenum 116.

While eight (8) UV light emitters 118 are shown in FIG. 4, any suitable number of the UV light emitters 118 may be utilized in the cooling tower 100. For example, 4, 6, 10, 12, or more of the UV light emitters 118 may be disposed in the plenum 116. The particular number of the UV light emitters 118 used may be based on a number of factors such as, for example, the volume of the plenum 116, the speed of the airflow, the burden of drift entrained in the airflow, the luminous flux of UV light emitted by the UV light emitters 118, and the like. The effectiveness of UV light inactivation or killing of organisms in a flow of air or drift may be calculated as described in, "DEFINING THE EFFECTIVENESS OF UV LAMPS INSTALLED IN CIRCULATING AIR DUCTWORK", Douglas VanOsdell and Karin Foarde, published in November 2002, the disclosure of which is incorporated herein in its entirety. In a particular example, the UV light emitters 118 may be effective in inactivating or killing organisms out to a distance of 1.5 meters (m) from the bulb. If distances exceed 1.5 m between the UV light emitters 118, additional ones of the UV light emitters 118 may be added.

The UV light emitters 118 are shown evenly distributed within the plenum 116. However, in other examples, the UV light emitters 118 may be disposed unevenly within the plenum 116. For example, as the air moves up through the plenum 116 and approaches the fan 106, the speed of the air flow increases and, because of the "V" shaped plenum 116, the volume proximal to the fan 106 is greater. To generate a sufficient luminous flux of UV light to destroy organisms in the drift, a greater number or more powerful versions of the UV light emitters 118 may be disposed in close proximity to the fan 106 as shown in FIG. 5.

To continue with the general description of the cooling tower 100, each of the collection basin modules 110, 114 and the heat exchange modules 120, 124 include a fill media portion. Specifically, the first collection basin module 110 includes a first fill media portion 130. The second collection basin module 114 includes a second fill media portion 132. The first heat exchange module 120 includes a third fill media portion 134. And the second heat exchange module 124 includes a fourth fill media portion 136. The fill media portions 130, 134 may form a first heat exchange section, and the fill media portions 132, 136 may form a second heat exchange section.

While the heat exchange modules 120, 124 are described as containing fill media, one of ordinary skill in the art would appreciate that the heat exchange modules 120, 124 may comprise other heat exchange means, such as, for example, closed circuit coils or tube bundles.

During operation, hot water placed in the hot water basins 138, 140 may travel through the cooling tower 100 in the longitudinal direction towards the cold water basins 102, 104. Specifically, hot water that is placed in the first hot water basin 138 may travel through the openings 108 in the first hot water basin 138 and into the third fill media portion 134 and then into the first fill media portion 130. In other words, the first fill media portion 130 and the third fill media portion 134 form a continuous path for the hot water which is placed in the first hot water basin 138 to travel along and into the first cold water basin 102. As the hot water travels along the length of the first fill media portion 130 and the third fill media portion 134 or, the first fill media section, it is cooled by cooler ambient air that travels horizontally (or substantially horizontally) into the first collection basin module 110 and the first heat exchange module 120 or, specifically, the first fill media portion 130 and the third fill media portion 134 disposed in the first collection basin module 110 and the first heat exchange module 120, respectively, from outside of the cooling tower 100. Thus, when the hot water reaches the first cold water basin 102, it has been cooled and is therefore received as cold water in the first cold water basin 102. The ambient air, which has been used to cool the hot water, is drawn into the plenum module 112 and the fan module 122 by the fan 106 and upwards and out of the cooling tower 100.

Similarly, hot water placed in the second hot water basin 140 may travel through the openings 108 in the second hot water basin 140 and into the fourth fill media portion 136 and the second fill media portion 132. The hot water that is placed in the second hot water basin 140 is separate from the hot water that is placed in the first hot water basin 138. Like the first fill media portion 130 and the third fill media portion 134, the second fill media portion 132 and the fourth fill media portion 136 form a continuous path for the hot water which is placed in the second hot water basin 140 to travel along and into the second cold water basin 104. Much in the same way that the hot water placed in the first water basin 138 is cooled, the water placed in the second hot water basin 140 is cooled using cooler ambient air which enters the second fill media portion 132 and the fourth fill media portion 136 from the sides of the second collection basin module 114 and the second heat exchange module 124.

The operation of cooling the hot water that is placed in the hot water basins 138, 140 that is described in that of a cross-flow cooling tower. Thus, the fill media portions 130, 132, 134, 136 may comprise cross-flow fill media.

To assemble the cooling tower 100 depicted in FIG. 1, the bottom layer of modules may be positioned, and then the top layer of modules may be positioned on top of the bottom layer of modules. For example, the first collection basin module 110 may be positioned, and the second collection basin module 114 may be positioned laterally spaced apart from the first collection basin module 110. The plenum module 112 may be positioned in the space between the first collection basin module 110 and the second collection basin module 114. The plenum module may be positioned prior to the fill media modules. The first heat exchange module 120 may be positioned on top of (or vertically adjacent to) the first collection basin module 110, and the second heat exchange module 124 may be positioned on top of (or vertically adjacent to) the second collection basin module 114. The first heat exchange module 120 and the second heat exchange module 124 may be placed such that the fill media portions 134, 136 line up with the fill media portions 130, 132, respectively, such that the fill media portion 130 and the fill media portion 134 create a continuous fill media section and the fill media portion 132 and the fill media portion 136 create a continuous fill media section. The fan module 122 may be positioned on top of the plenum module 112 in between the first heat exchange module 120 and the second heat exchange module 124. The fan module may be positioned prior to the fill media modules.

The cooling tower 100 depicted in FIG. 1 comprises a single cell. Nonetheless, one of ordinary skill in the art would appreciate that the module heat transfer tower 100 may comprise more than one cell. Importantly though, as depicted in FIG. 1, each cell of the cooling tower 100 would comprise at least two (2) water basins (e.g., water basins 102, 104), and each cell can be divided into six (6) modules.

Each of the six (6) modules of the cooling tower 100 may be assembled in a factory and transported to a job site for final assembly in the cooling tower 100. In particular, the first collection basin module 110 may be assembled in a factory including the first water basin 102, and the second collection basin module 114 may be assembled in a factory including the second water basin 104. Because both the first water basin 102 and the second water basin 104 are assembled into modules at the factory, no water sealing would need to be done at the job site where the cooling tower 100 is assembled. The fan 106 and the fan cylinder (not labeled) may be assembled at the job site.

Figure 5:
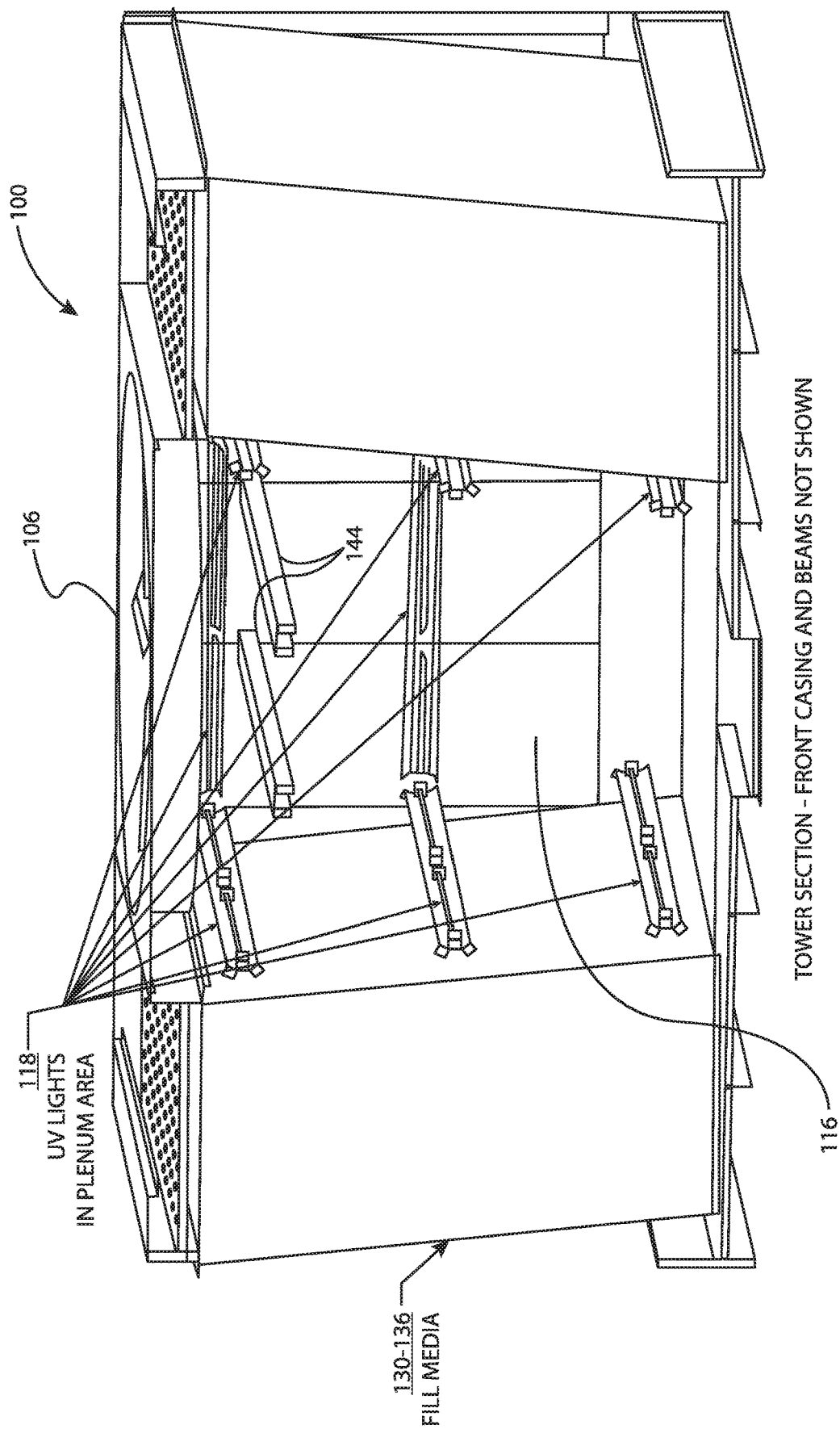
FIG. 5 is a perspective cross-sectional view of a cooling tower similar to the cooling tower depicted in FIG. 1 showing another arrangement of the plurality of ultraviolet (UV) light emitters in accordance with an embodiment of the present disclosure.

FIG. 5 is a perspective cross-sectional view of the cooling tower depicted in FIG. 1 showing another arrangement of the UV light emitters 118 in accordance with an embodiment of the present disclosure. As shown in FIG. 5, additional ones of the UV light emitters 118 are disposed on side panels in the middle and near the top (proximal to the fan 106) of the plenum 116. That is, a relatively higher percentage of the UV light emitters 118 may be disposed closer to an outlet from the cooling tower 100 in comparison to parts of the plenum 116 that are further from the outlet e.g., the fan 106. In this manner, faster moving air and the drift entrained in the air proximal to the outlet or fan 106 is exposed to a greater luminous flux of UV light. Alternatively, or in addition, extra ones of the UV light emitters 118 may be disposed on one or more fan support struts 144 or between existing ones of the UV light emitters 118 disposed against the fill media portions 130-136.

Although the cooling tower 100 shown in FIGS. 1-5 is an induced draft cooling tower, it is to be appreciated that drift may occur in other types of cooling towers such as, for example, natural draft cooling towers. As such, aspects of the invention may be suitable for use in natural draft cooling towers or other types of cooling towers. In a particular example, the UV light emitters 118 may be disposed within the hyperbolic shell of the natural draft cooling tower. Natural draft cooling towers are typically large structures so the UV light emitters 118 may be disposed upon a gridwork within the hyperbolic shell in order generate a sufficient luminous flux of UV light to inactivate or destroy organisms in the drift. To improve efficiency, a relatively higher number of the UV light emitters 118 may be disposed closer to an outlet of the natural draft cooling tower as compared to within the body of the cooling tower.

Figure 6:
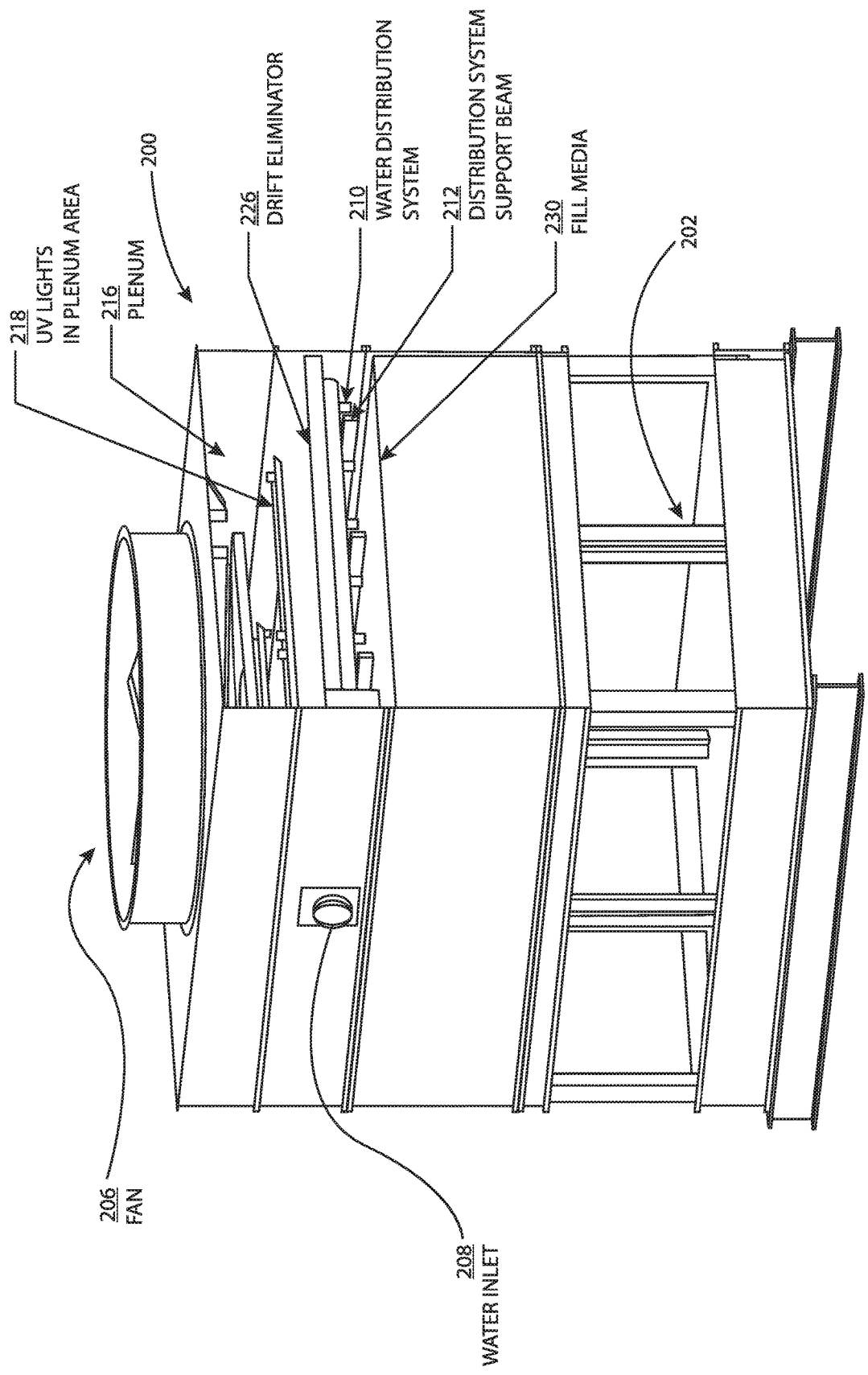
FIG. 6 is a perspective view of a second exemplary cooling tower in accordance with an embodiment of the present disclosure.

FIG. 6 is a perspective view of a second exemplary cooling tower 200 in accordance with an embodiment of the present disclosure. As shown in FIG. 6, the cooling tower 200 includes a water basin 202, a fan 206, a water inlet 208, a water distribution system 210, a distribution support system 212, a plenum 216, a plurality of UV light emitters 218, a drift eliminator 226, and a fill media 230. The cooling tower 200 is an example of a counterflow heat exchange that is generally understood except for the novel addition of the UV light emitters 218. In a manner similar to that already described herein, the UV light emitters 218 are disposed in the plenum 216 and configured to destroy or inactivate biological organisms within the drift. In this manner, ejection of viable organisms from the cooling tower 200 is reduced or eliminated.

Figure 7:
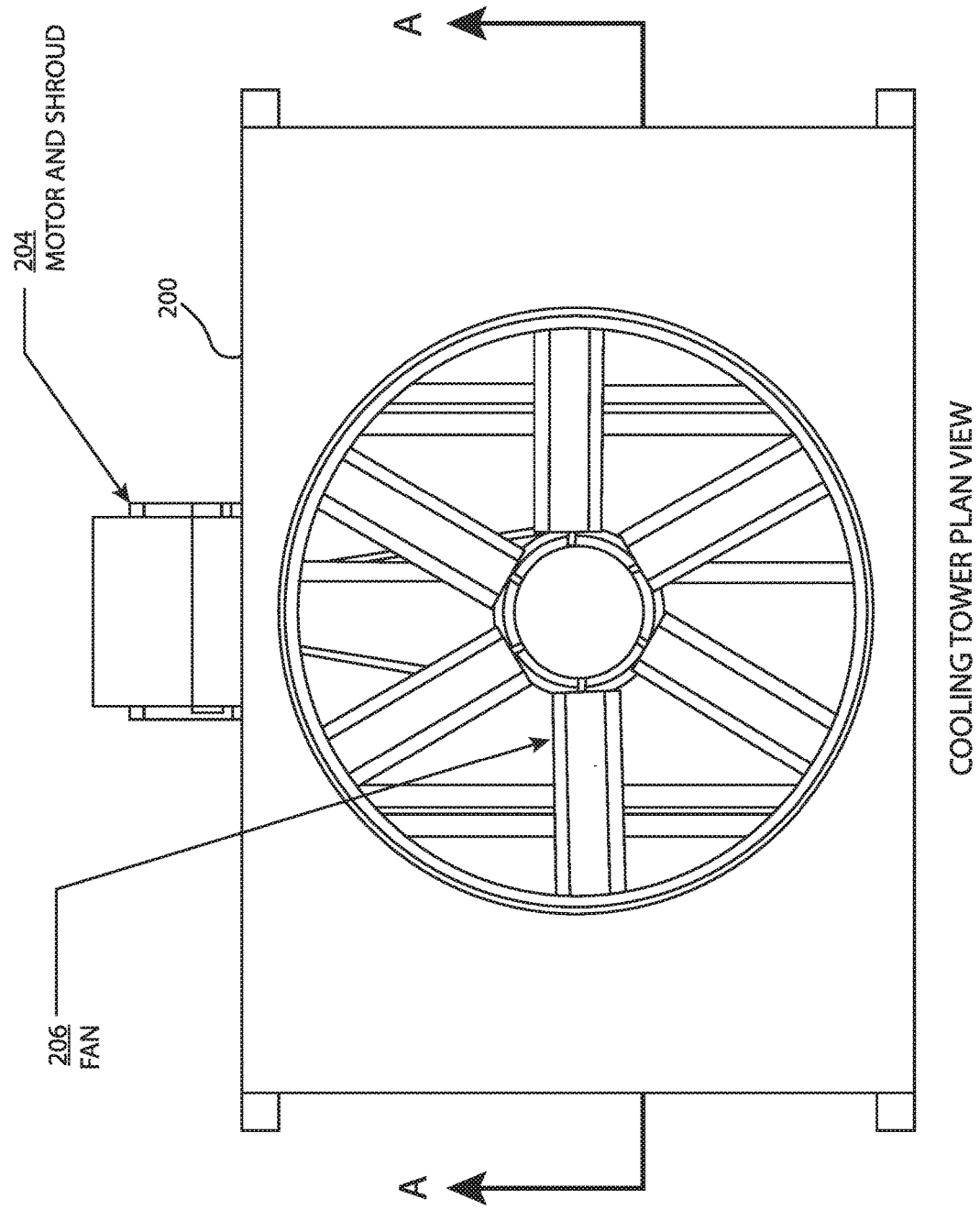
FIG. 7 is a top view of the cooling tower depicted in FIG. 6 showing an air current generator in accordance with an embodiment of the present disclosure.

FIG. 7 is a top view of the cooling tower 200 depicted in FIG. 6 showing the fan 206 in accordance with an embodiment of the present disclosure. Also shown in FIG. 7 is a motor and shroud 204 configured to drive the fan 206.

Figure 8:
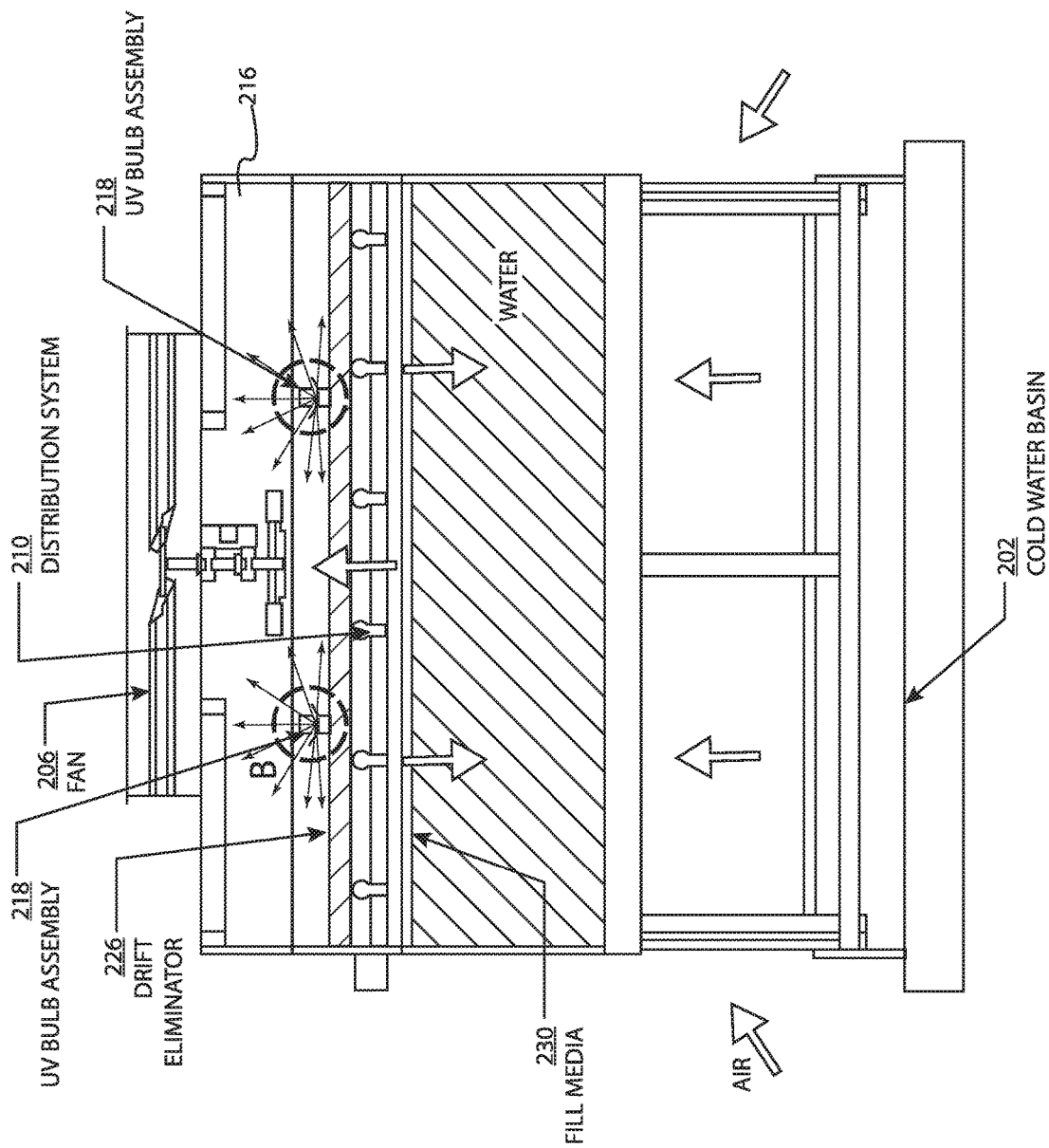
FIG. 8 is a cross-sectional view of the cooling tower depicted in FIG. 6 showing the plurality of ultraviolet (UV) light emitters in accordance with an embodiment of the present disclosure.

FIG. 8 is a cross-sectional view of the cooling tower 200 depicted in FIG. 6 showing the plurality of UV light emitters 218 in accordance with an embodiment of the present disclosure. As shown in FIG. 8, the UV light from the UV light emitters 218 is directed up toward the plenum 216 and away from the drift eliminator 226 to increase destruction of any organisms in the drift and minimize UV exposure of the drift eliminator 226. The UV light emitters 218 in the cooling tower 200 are configured to perform in a manner similar to the UV light emitters 118 in the cooling tower 100 described with reference to FIGS. 1-5.

Figure 9:
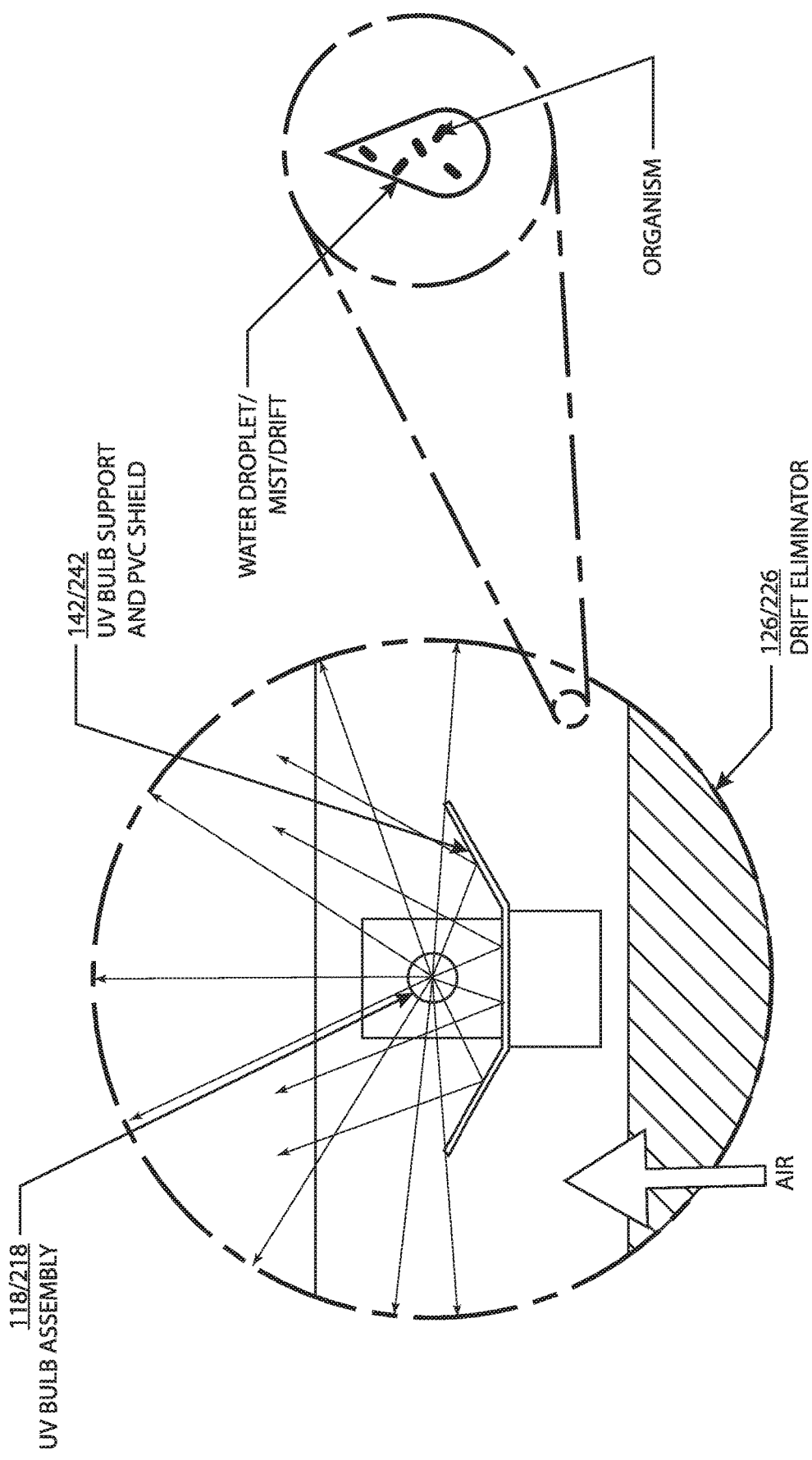
FIG. 9 is a detailed in-line view of the UV light emitter and the operation of an optional shield in accordance with an embodiment of the present disclosure.

FIG. 9 is a detailed in-line view of the UV light emitter 118/218 described with reference to FIGS. 1-8 and the operation of an optional shield 142/242 in accordance with an embodiment of the present disclosure. As shown in FIG. 9, UV light emitted by the UV light emitter 118/218 may be shielded from the drift eliminator 126/226 by the shield 142/242. In addition, the shield 142/242 may be configured to reflect UV light away from the drift eliminator 126/226 to increase the destruction of any organisms in the drift.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, for example an induced draft heat exchanger has been illustrated but a forced draft design can be adapted to gain the same benefits and, accordingly, all suitable modifications and equivalents may be resorted to that fall within the scope of the invention. As noted above, another example is replacing one or more of the modules containing fill media with modules that may include closed circuit coils or tube bundles for cooling and/or condensing fluids. In yet another example one or more modules may include fill media and closed circuit coils, tube bundles, or splash bars.

Another construction in the spirit of the scope of this invention is to add more modules in the plan view. For example a tower of approximately twice the cooling capacity could be comprised of twice as many collection basin modules, twice as many heat exchange modules and four times as many plenum and fan modules. More than twice as many plenum and fan modules may desirable to place a larger diameter fan. Furthermore, an odd number of plenum and fan modules may desirable to have a central module that contains the fan mechanical equipment, particularly the motor, gearbox, and fan hub.

Yet another construction is spirit of the scope of this invention is to add more modules vertically. For example additional modules with heat exchangers could be placed between the collection modules and the heat exchange modules as previously described. Additional modules between the plenum modules and the fan modules can be placed to compliment taller overall heat exchanger assemblies.

Also, in the spirit of the scope of the invention is a construction using fewer modules. For example the plenum module or portions of the plenum module can be incorporated in one or both collection basin modules. Likewise, the fan module or portions of the fan module can be incorporated in one or both of the heat exchange modules.

Another construction in the spirit of the scope of the invention using fewer modules may be a one module high tower with two collection basin modules. The plenum and fan may also reside in those same collection basin modules but may also reside in a separate single module. In this case, the first heat exchange section and the second heat exchange sections are fully contained in the respective collection basin modules.

What is claimed is:

1. A cooling tower, comprising:
   a fill media;
   a water distribution system to distribute water to the fill media, wherein a flow of air passes through the fill media and past a flow of the water;
   a plenum defined by a volume between the fill media and an outlet;
   an ultraviolet (UV) light emitter disposed perpendicularly to the flow of air in the plenum and configured to inactivate organisms in a drift; and
   a shield disposed between the UV light emitter and the fill media and configured to reduce UV irradiation of the fill media and to reflect UV light.

2. The cooling tower according to claim 1, further comprising a plurality of the UV light emitters.

3. The cooling tower according to claim 2, further comprising a relatively higher percentage of the plurality of UV light emitters being disposed proximal to the outlet in comparison to a remainder of the plenum.

4. The cooling tower according to claim 1, further comprising a drift eliminator disposed between the fill media and the plenum.

5. The cooling tower according to claim 1, wherein the cooling tower is a crossflow cooling tower.

6. The cooling tower according to claim 1, wherein the cooling tower is a counter-flow cooling tower.

7. The cooling tower according to claim 1, further comprising a fan to generate the flow of air.

8. The cooling tower according to claim 1, further comprising a hyperbolic shell to generate the flow of air via warm air rising in the hyperbolic shell.

9. A method of treating a drift from a cooling tower, the method comprising the steps of:
   providing a fill media;
   providing a water distribution system;
   generating a flow of water through the fill media with the water distribution system;
   generating a flow of air through the fill media and out of the cooling tower through an outlet;
   disposing an ultraviolet (UV) light emitter perpendicularly to the flow of air in a plenum of the cooling tower and configuring the UV light emitter to expose the drift in the plenum to a sufficient luminous flux of UV light to inactivate organisms in the drift, wherein the plenum is defined by a volume between the fill media and the outlet; and
   shielding the fill media from UV light exposure with a shield that reflects UV light disposed between the fill media and the UV light emitter.

10. The method according to claim 9, further comprising the step of disposing a plurality of the UV light emitters in the plenum.

11. The method according to claim 10, further comprising the step of disposing a higher percentage of the plurality of UV light emitters proximal to the outlet in comparison to the percentage of UV light emitters distal from the outlet.

12. The method according to claim 9, further comprising the step of disposing a drift eliminator between the fill media and the plenum.

13. The method according to claim 9, further comprising the step of generating the flow of air with a fan.

14. The method according to claim 9, further comprising the step of generating the flow of air via warm air rising through the cooling tower.

* * * * *